United States Patent [19]

Avramidis

[11] Patent Number: 4,915,675
[45] Date of Patent: Apr. 10, 1990

[54] PITCH EQUALIZED CHAIN WITH FREQUENCY MODULATED ENGAGEMENT

[76] Inventor: Stellios A. Avramidis, 2028 Foxcliff North, Martinsville, Morgan County, Ind. 46151

[21] Appl. No.: 316,776

[22] Filed: Feb. 28, 1989

[51] Int. Cl.$^4$ ............................................. F16G 13/04
[52] U.S. Cl. ..................................... 474/213; 474/214
[58] Field of Search ................. 474/206, 202, 212–217

[56] References Cited

U.S. PATENT DOCUMENTS

| | | | |
|---|---|---|---|
| 16,521 | 7/1909 | Ashdown | 474/214 |
| 1,138,236 | 5/1915 | Morse | 474/213 X |

*Primary Examiner*—Thuy M. Bui
*Attorney, Agent, or Firm*—Robert A. Brown

[57] ABSTRACT

A power transmission chain having a plurality of pin connected articulating and guide ranks wherein each rank may include plain links having a thickness that may vary from rank to rank. A group of plain links having a preselected thickness is disposed in articulating ranks throughout the chain. Other groups of plain links having a different preselected thickness are disposed in nonarticulating ranks of the chain. The combination of different thickness plain links disposed in a preselected manner coupled with elastic guide links throughout the chain is effective to minimize wear.

The groups of plain links having preselected but different thicknesses cooperate with different thickness guide links therein so as to improve load distribution thereacross, achieve equal deformation between the plain links and the guide links and maintain the transverse connecting pins substantially parallel to each other.

The plain links in this chain which are of the two toe variety are characterized by having nonidentical toes. As a result of this difference, the dimensions from the center of the pins to the working surfaces of each toe vary with the result being that the timing between successive link and sprocket tooth engagements can be varied.

27 Claims, 3 Drawing Sheets

PITCH EQUALIZED CHAIN WITH FREQUENCY MODULATED ENGAGEMENT

BACKGROUND OF THE INVENTION

The present invention relates generally to power transmission chains and more particularly is directed to vehicles having engine driven front wheel drive chains wherein load carrying capabilities, fatigue strength, and wear resistance are greatly increased, and which exhibit superior noise characteristics through special sprocket/chain engagement means.

DESCRIPTION OF THE PRIOR ART

A conventional power transmission chain drive is comprised of an endless chain draped about two sprockets supported by two generally parallel shafts. One of the shafts is termed an input shaft and has mounted thereon a driving sprocket. The other shaft is termed an output shaft and has mounted thereon a driven sprocket. The endless chain is assembled from interconnected links having formed thereon tooth portions that are adaptable to fit over and about teeth formed on the driving sprocket, and on the driven sprocket. The vehicle engine supplies input power to the input shaft and driving sprocket, the power flows through the endless chain to the driven sprocket and the output shaft, and thereafter imparts motive energy to operate the vehicle.

The use of a power transmission chain in an automotive application is illustrated by a vehicle engine and an automatic transmission disposed in a parallel relationship. A chain and sprocket drive arrangement connects a hydrodynamic torque converter output shaft of the engine to the transmission power input shaft. The transmission drives the vehicle wheels through an output shaft, gears, and a cross shaft. Thus, the chain and sprocket drive apparatus tranduces powder from the engine to the wheels.

The endless chains, commonly referred to as silent chains, are assembled from a series of interconnected link plates having tooth portions that mesh with the teeth of the sprocket wheels. The silent chain used in automotive chain drives is assembled from several links positioned along side of or adjacent to each other to form a set or rank of links. A plurality of sets or ranks of links are interleaved with one another and secured by pins to construct a series of connected ranks and build an endless chain of any desired length. The links of a silent chain each have a pair of toes, separated by a crotch. Each toe is defined by outside and inside flanks. The inside flanks define the crotch.

Silent chains have been employed in the past to drivingly engage sprocket teeth either with the inside flanks or with the outside flanks of the links. Historically, outside flank engagement has been used with industrial power transmission drives, and inside flank engagement has been used with automotive timing drives. Inside engagement occurs with initial contact between the sprocket tooth and an inside flank of the link. This inside contact is sometimes referred to as crotch contact. Outside flank engagement occurs with initial contact between the sprocket tooth and an outside flank of the link. Outside contact is sometimes referred to simply as flank contact.

By definition, an inside engagement link is formed to have a larger dimension from a pin center to its nearest inside flank of the link than the dimension from the pin center to its nearest outside flank of the link. On the other hand, an outside engagement type link will have a larger dimension from a pin center to its nearest outside flank of the link than the dimension from the pin center to its nearest inside flank of the link.

Power transmission chain drives have been used for many years in the automotive industry either in timing chain applications or to transfer power from engine to transmission. It has been common practice to employ both inside and outside contact links in these two applications. Whether chains were of the inside contact type or the outside contact type, both toes of the link were nearly identical so that the chain would engage the sprocket in the same manner regardless of direction of travel.

Noise is always associated with chain drives. The two main noise sources for chain drives are as follows:

(1) impact sound generated by the collision of the chain and the sprocket at the onset of meshing. The loudness of the impact sound is affected by the impact velocity between the chain and sprocket at the onset of meshing.

(2) sound made by the transverse vibration of the tight side chain.

The meshing impact sound is the most noticeable and periodic sound in silent chain drives. The impact sound is repeated with a frequency equal to that of the meshing frequency. The frequency of the noise corresponds to the number of teeth on the sprocket and the speed of the sprocket.

The tonal noise generated by a chain drive in a modern automobile is difficult to detect because of the other competing noises which are produced. Many attempts have been made to solve this problem. U.S. Pat. No. 1,868,334 to Morse is directed to solving this problem by using two types of links, wherein the pin apertures are so located as to result in variable pin spacing. This concept for chains was followed by Sand in U.S. Pat. No. 3,377,875 modifying the sprockets by relieving the flanks of the teeth so as to reduce tonal noise. The modified sprocket accomplished by the Sand '875 patent may be described as a standard sprocket in which contact flanks or roots of the teeth have been relieved to vary the contact with the links of an endless chain. In 1970 Griffel in U.S. Pat. No. 3,495,468 taught a variation of the Sand U.S. Pat. No. 3,377,875 by using random root relief of sprocket teeth to achieve noise reduction in contacts between the chain and the sprocket. Griffel improved this concept in U.S. Pat. No. 4,168,634 wherein sprocket teeth and roots are relieved predetermined amounts for better noise reduction characteristics. A modified sprocket is also referred to as a hybrid sprocket. In U.S. Pat. No. 4,342,560 that issued in 1982, Ledvina et al suggested the use of a combination of two well known link forms, one having curved inside flanks used primarily in automotive applications, the other having straight inside flanks more commonly used in industrial applications. The two types of links are referred to as inside and outside contact links with a purported purpose to achieve a reduction in tonal noise. However, to manufacture this chain, two link forms must be produced, and care must be taken to ensure that the two link shapes are not mixed in a set of links, because, while disclosed in U.S. Pat. No. 4,342,560, such arrangement has not proved successful for the intended purpose. An endless chain that includes inside and outside contact links for noise reduction is termed a hybrid chain.

One advantage of using a hybrid chain results in avoiding the need to modify the sprocket. A disadvantage is encountered during assembly of a hybrid chain incorporating different types of links. The need arises to identify, separate and maintain within each rank identical links and prevent a different link from being intermixed that would disrupt and change a preselected pattern of engagement between the links in ranks of a chain and the teeth of the sprockets.

As hereinabove described, the dimension which determines whether a link makes inside or outside flank engagement is the distance between the pin center and the working surfaces. This dimension is critical in determining whether the inside flank or the outside flank will protrude and produce either inside or outside flank engagement. Other dimensions such as the overall dimensions of a link are not important in determining whether a link is an inside contact flank engagement link or an outside contact flank engagement link.

During the operation of power transmission chains in being continuously propelled between a driving sprocket and a driven sprocket, a chain is subjected to many different types of forces, stresses, strains, torque and the like. The chain is made from a plurality of individual links positioned side by side to form a row or rank and any number of these rows or ranks are joined together by pins to form an endless chain. There may be as few as 60–100 rows of links in a typical chain or as many as 120 rows of links. The number of links in a given row or rank may be as few as two or in some cases there may be upwards of 40 positioned adjacent to each other.

As the chain moves between the driving sprocket and the driven sprocket, it can be readily understood that when each row of links contacts a sprocket tooth the links in a row will be subjected to forces that will tax the inherent physical characteristics of the material from which the links are formed. Various portions or sections of the links at diverse times during the cycle of operation will be subject to tension, compression, twisting, elastic deformation, non-uniform wear between link apertures and connecting pins, and a host of other types of debilitative effects.

In addition, it should be understood that each link in a row is subjected to different forces as it is supported by a connecting pin. For example, the pin may be considered as a simple beam supported at its outer ends. During operation of an endless chain, the links in each row are distorted when the row comes into contact with a sprocket tooth, remains in contact therewith during articulation thereabout, and then moves out of contact with the sprocket tooth.

The distortion of the pivoting links results from forces acting on the pin or beam caused by the pin being subjected to bending moments that in turn deform the links on the outer ends of the pin to a larger degree than the links disposed in the middle or central portion of the pin. When the bending moment forces in the pin change or are released, all of the links in a row tend to return to a straight line position. However, because the outer links have been deformed to a greater extent than the inner links, the outer links tend to lose contact with the outer peripheral surface of the pin. This in turn causes an unbalance in load distribution among links in the same row, even though they are all of the same size and shape.

Further, the chain includes rows of links that have disposed on a transverse pin a guide link at each outer end maintaining therebetween the links of a rank. These two guide links serve to connect the pins of adjacent rows and also act to track the chain over the sprockets during movement of the chain therearound. Typically, because of their different requirement of performance during operation of the chain, guide links are structurally more rigid than the remaining plain links of the same rank or row. A guide link row thus comprises links of varying physical characteristics; i.e., plain links whose teeth engage the teeth of the sprockets and more rigid, non-sprocket engaging guide links that hold the chain together during operation thereof. Accordingly, it would be desirable to dispose guide links and plain links along a guide link row in a manner to ensure that the transverse pins when loaded are maintained substantially parallel to each other so that friction is minimized between the pins and the apertures of the links and thereby eliminate excessive wear therebetween.

In order to accomplish equalization of distortion between two guide links and the plain links of a power transmitting chain there are several factors to consider, such as the thickness of a guide link, the thickness of a plain link, the number of plain links, the relative elasticity between a guide link and a plain link, the comparative configurations of a guide link and a plain link, critical points of stress within the respective links, and the like.

SUMMARY OF THE INVENTION

Accordingly, it is a primary object of the present invention to provide a power transmission drive chain that is capable of carrying greater static and dynamic loads with minimum wear to the chain while exhibiting improved noise characteristics.

An additional object of the present invention is to provide a power transmission drive chain capable of greatly increased fatigue strength.

It is a further object of the present invention to provide a power transmission drive chain having a plurality of articulating and guide ranks wherein each articulating rank may include plain links having thicknesses that may vary from the thicknesses of the plain links in the guide ranks so as to improve load distribution across each rank and thereby maximize wear life.

It is still a further object of the present invention to provide a power transmission drive chain having a plurality of guide ranks wherein guide links are effective to achieve equal deformation with other plain links within each rank so as to improve load distribution across each rank and thereby maximize load carrying capacity.

Another object of the present invention is to provide a power transmission drive chain having a plurality of links disposed in ranks of the chain that cooperate to balance load distribution between ranks and maintain transverse connecting pins substantially parallel to each other.

An additional object of the present invention is to provide a power transmission drive chain having a plurality of articulating ranks and a plurality of guide ranks wherein unit load distribution of a guide rank is substantially greater than unit load distribution of an articulating rank.

An additional object of the present invention is to provide a power transmission chain having a plurality of plain links which engage standard or uniform sprockets, having substantially identical or non-modified teeth or roots, always at the same working surfaces but at varying time intervals so as to improve the tonal frequency characteristics of the chain drive.

An additional object of the present invention is to provide a power transmission chain having a plurality of substantially identical plain links which exhibit different dimensions between the center of the pins and the working surface of the one toe compared to the other toe of the same link.

A further object of this invention is to provide a power transmission chain having a plurality of plain links having two toes which however are not the same; one toe being overall smaller than the other toe of the same link, and placing or arranging within the chain, the differently sized toes in a manner such that the timing interval between successive sprocket tooth contacts either increases or decreases from a nominal value depending upon whether a short or small toe follows a large toe or a large toe follows a short or small toe.

A power transmission chain constructed in accordance with the present invention comprises a plurality of plain links arranged in side by side relationship to form a plurality of ranks of links, each of the plain links having apertures formed therethrough to receive a pin and having two dissimilar sprocket engaging toes, one characterized as a large toe and the other as the small toe, a plurality of guide links having apertures formed therethrough to receive a pin, the guide links being mounted on distal ends of pins connecting first alternate ranks of plain links so as to form a guide link row, the other alternate ranks of plain links being effective to form an articulated link row, a plurality of guide link rows and a plurality of articulated link rows being interweaved and interconnected by the pins to form the chain, the plurality of plain links in each guide link row being disposed between the guide links, the plurality of guide links in each guide link row each being equal in thickness and having a configuration that avoids any peripheral discontinuity, whereby when the chain is subjected to a load, the configuration and the thickness of the guide links cause the guide links to elongate substantially similarly to the plain links in each of the guide link rows thereby preventing deformation of the connecting pins and maintaining the pins substantially parallel to each other.

According to the invention disclosed herein a power transmission chain is constructed of transversely aligned sets of links joined together in a continuous assembly, each link of each set having the same shape with a pair of toes each defined by diverging outside and inside flanks, the toes being separated by a crotch; one toe of each link being different in configuration from the other toe of each link with the different shaped toes in each set being transversely aligned; and some sets of links being flip-flopped in said continuous assembly so that said different toes are leading toes while in the remainder of said sets of links said different toes are trailing toes.

BRIEF DESCRIPTION OF THE DRAWING

The foregoing and other characteristics, objects, features and advantages of the present invention will become more apparent upon consideration of the following detailed description, having reference to the accompanying figures of the drawing, wherein.

DESCRIPTION OF A PREFERRED EMBODIMENT

Figure 1:
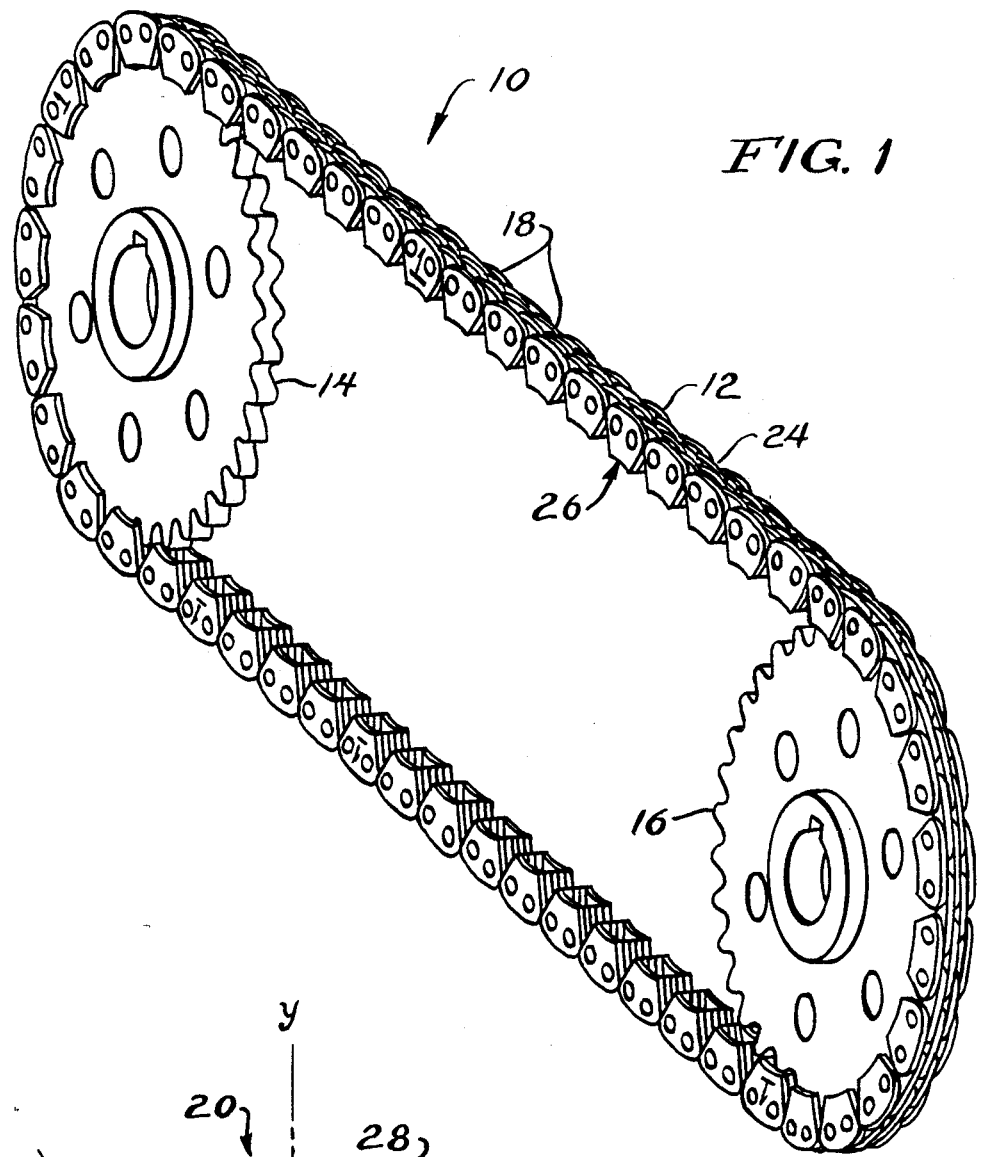
FIG. 1 is a perspective view from above and to the side of a front wheel drive chain of the invention showing a chain, driving sprocket and driven sprocket in assembled relationship comprising a plurality of sets or ranks of plain links interleaved and connected together by pins, and including guide links positioned at outer ends of alternate plain link ranks throughout the length of the chain.

Now referring to FIG. 1, there is shown a chain and sprocket assembly generally designated by reference numeral 10 comprising an endless chain 12, a driving sprocket 14, and a driven sprocket 16. The chain is constructed from a plurality of links (hereinafter described in detail) positioned side by side to form a set or rank 18. Each rank is then positioned serially adjacent to and interleaved with a next or subsequent rank and the interleaved ranks are joined by connecting pins to form the endless chain. The number of sets or ranks of links joined together by the pins can be of any number to form any desired length of chain.

Figure 2:
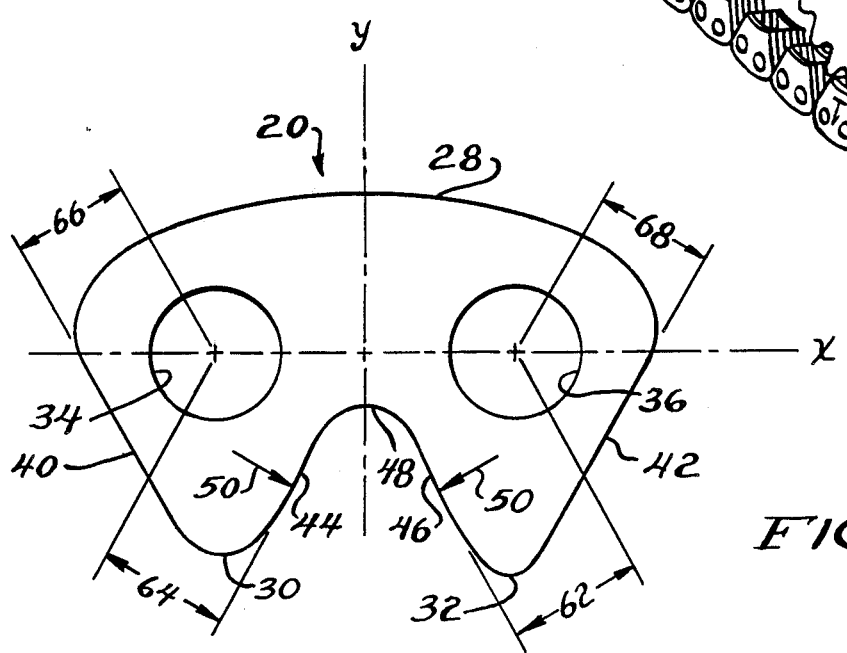
FIG. 2 is a side elevational view of a plain link adaptable for assembly into a plurality of interconnected ranks comprising the chain of FIG. 1 showing the two dissimilar toes and the different distances from the center of the pin to the inside working surfaces.
Figure 5:
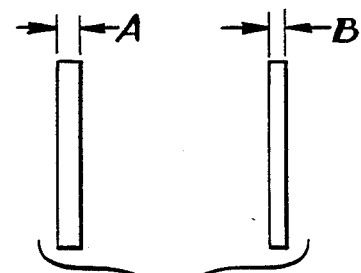
FIG. 5 is an end view of the plain link shown in FIG. 2 showing it to have two schematic dimensional thicknesses, A and B, wherein A thickness is greater than B thickness.
Figure 7:
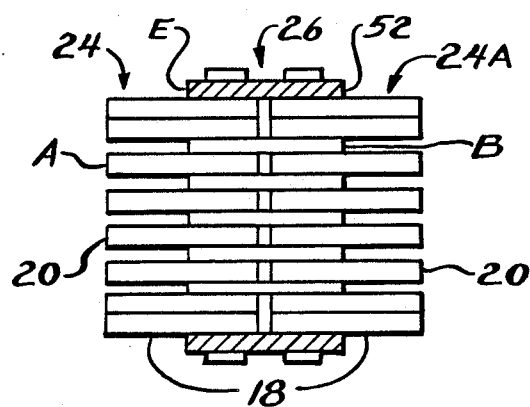
FIG. 7 is a top plan view of a three rank segment of plain links of the front wheel drive chain of FIG. 1 showing the left and right hand outer plain link ranks forming an articulated pitch, the inner plain link rank combining with two guide links to form a guide pitch and the links of the ranks being oriented in an interleaved relationship.
Figure 8:
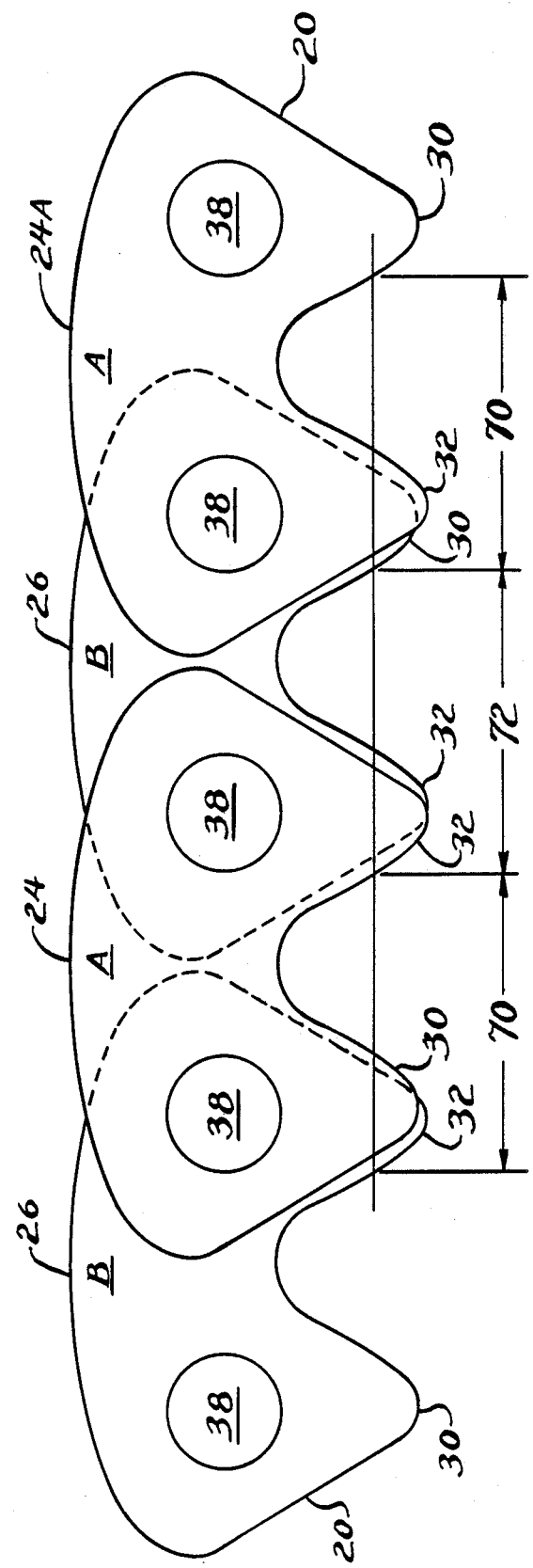
FIG. 8 is a side elevational view of a four rank segment showing the ranks of plain links in conjunction with guide links (not shown) being effective by pin means to connect together ranks of articulated pitches, demonstrating the arrangement of assembling the plain links with the dissimilar toes reversed. It also shows the difference in distance between successive engagement points due to the two possible link orientations.

Each set or rank 18 of the chain 12 may comprise a plurality of plain links 20 as depicted in FIG. 2. The link 20 is formed in two sizes, a first size having a thickness A and a second size having a thickness B, both as shown in FIG. 5. It should be understood that a link 20 having a thickness A is dimensionally thicker than a link 20 having a thickness B. A link 20 having a thickness A is intended to be placed along with other identical links in a rank 18 identified generally as an articulated pitch 24 as shown in FIGS. 1, 7, and 8. A link 20 having a thickness B is intended to be placed along with other identical links in an adjacent or successive rank 18 identified generally as a guide row pitch 26 as shown in FIGS. 1, 7, and 8.

Directing attention to FIG. 2, each link indicated generally by the arrow 20 includes a top or back side 28, a bottom part comprising two unequal length, dissimilarly shaped teeth or toes 30 and 32 and two apertures 34 and 36 disposed substantially vertically above each toe formed on the bottom side of the link.

For convenience of description, each link 20 will be considered to have a horizontal, longitudinal axis that extends through and connects the centers of each aperture 34 and 36 or pin hole and divides the link into an upper and a lower portion. The upper portion of the link extends generally above the horizontal axis and is termed a generally arcuate back side of the link. The lower portion of the link extends generally below the horizontal axis, is termed the toe or tooth side of the link and may be described as asymmetrical in shape. Also, each link is considered to have a vertical, central axis that bisects equally the distance between the centers of the pin holes and divides each link into a left hand and a right hand side. The horizontal axis may be considered an "x" axis and the vertical axis may be considered a "y" axis. Together they effectively separate the link into four quadrants. the upper two quadrants being substantially symmetrical, the lower two quadrants being asymmetrical.

The round apertures 34 and 36 of each link 20 are adaptable to receive therein a respective complementary elongate, solid, cylindrically shaped pin 38 (FIG. 5). Each link 20 includes a respective arcuate upper or back portion 28 extending generally above the longitudinal center line connecting the centers of the pitch holes and a respective lower or tooth portion extending downwardly from the longitudinal center line of the link forming the two downwardly extending dissimilar toes or teeth 30 and 32. The two toes 30, 32 of each link have their respective outer working surfaces or flanks 40 and 42 formed to provide relatively straight surfaces sloping inwardly or toward the vertical central axis y that divides substantially equally the distance between the centers of the pin holes 34 and 36. The inner working surfaces or edges of each toe 30 and 32 are shaped in the form of curved or arcuate flanks 44 and 46 or they can also be straight. These surfaces begin at the lower most extremity of each toe and extend inwardly and upwardly toward the middle portion of each link to meet and form a crotch portion 48 thereat.

As FIG. 2 clearly shows, the toes 30 and 32 of link 20 have differently shaped configurations. Even though the inner surfaces 44 and 46 of toes 30 and 32 are both arcuate in shape, and are both formed by substantially equal radii 50, the center point of each respective radius 50 is located at different remote locations respectively (not shown) in the first and second quadrants and therefore establish different distances between the inner surface 44 and the center of aperture 34 and the inner surface 46 and the center of aperture 36. For example, the distance 62 from the center of the pin of aperture 36 to inner working surface 46 is greater than the distance 64 from the center of aperture 35 to working surface 44. Additionally, the length of toe 30 is shortened so as to maintain a reasonable radius of curvature at the tip of the tooth or toe. Even though the distance 64 from the pin center to the working inner surface 44 is reduced, this distance remains greater than the distances, 66, 68 from the center of the pin to the outside working surfaces 40, 42; thus, the link in either of the two possible orientations, short toe leading or short toe trailing, will function primarily as an inside engagement link with only subsequent or secondary closing outside engagement as previously taught by Morse in U.S. Pat. No. 1,878,882.

Figure 3:
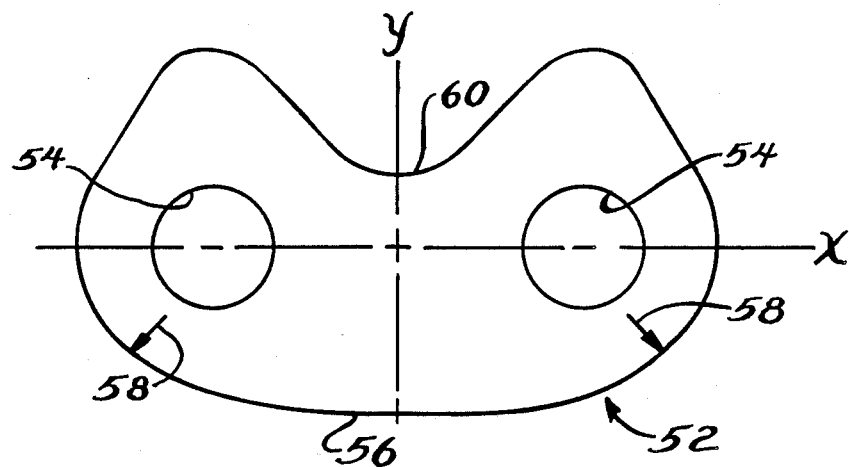
FIG. 3 is a side elevational view of a guide link for positioning at outer ends of plain link ranks and being connected by pins to hold successive ranks in an assembled relationship and for keeping the chain on a sprocket as it moves therearound.
Figure 4:
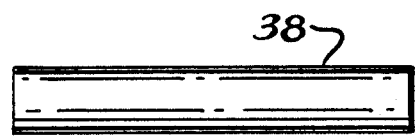
FIG. 4 shows a pin used for connecting the various ranks of links of the chain in a tandem relationship of successive rows to form an endless chain.
Figure 6:
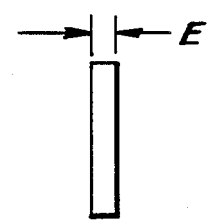
FIG. 6 is an end view of the guide link shown in FIG. 4 showing it to have a single schematic dimensional thickness.

Referring to FIG. 3, there is shown a guide link 52 having a configuration substantially kidney shaped in profile disposed about a horizontal axis x and a vertical axis y that together serve to divide the guide link into four quadrants. The link 52 has disposed at equal distances outwardly from the vertical axis y a pair of apertures 54. The apertures 54 have their respective centers located along and coincide with the horizontal axis x. The link 52 is formed having a bottom edge or surface 56 that extends essentially horizontally, but may be slightly curved, for a preselected distance on either side of axis y and then is caused to generate by a bottom radius 58 in a first curvilinear direction upwardly to and somewhat beyond the x axis. From this juncture, the surface diverges upwardly and inwardly for a preselected distance, then is caused to bend radially, and thereafter generates downwardly and inwardly to form an upwardly extending toe. In similar fashion, a surface from the other side of the link is generated upwardly and inwardly, rounded off, thereafter extended downwardly and inwardly to form another toe. The two toes form therebetween a concave portion or crotch 60. It will be understood that the two toes of the guide link 52 are similar to the toes of a plain link 20, but are of a lesser length or height. In addition, the crotch 60 of a guide link is somewhat shallower than the crotch 48 of a plain link; thus the distance from the root of the crotch to the x axis of a guide link is greater than the distance from the root of a plain link crotch to its respective x axis. It will be noted that the two quadrants disposed below the x axis together have a summation of area substantially greater than the summation of area of the two quadrants of the link 52 disposed above the horizontal axis x. As depicted in FIG. 6, the guide link 52 is shown as having a single dimensional thickness E. It should be noted the thickness E of guide link 52 may differ by a preselected amount from the dimensions A and/or B of plain link 20.

It will be understood that the manner in which the peripheral surface of the guide link 52 is generated to form its profile or overall configuration as being substantially kidney shaped avoids any abrupt discontinuity, notching, or other similar type interruption throughout its entire circumferential surface. Thus, each guide link 52, having a homogeneous, continuous profile is designed to deform under load in a predetermined, predictable mode of operation without incurring substantial stress raisers. Further, when two guide links are assembled on a pin along with a plurality of plain links therebetween to form a rank in a chain, and are subjected to a load during operation of the chain about a sprocket, the two guide links 52 deform substantially equally with the plurality of plain links so as to achieve an improved distribution of the load and thereby maximize wear life of the component parts that make up the chain.

Referring to FIGS. 7 and 8, the chain 12 as shown in a typical multiple row somewhat of ranks 18 comprises an articulated pitch 24A including a set of plain links 20 assembled with the short toe 30 in the leading position assuming the chain moves from left to right. The sets of links 20 in articulated pitches 24 and 24A are formed from an A dimension thickness. In addition, the segment of ranks 18 includes a guide pitch 26 comprising plain links 20 assembled also with the short toe 30 in the leading position. The sets of plain links 20 in guide pitch 26 are formed from a B dimension thickness.

According to the invention disclosed herein, a power transmission chain is constructed solely with one identical link form or peripheral shape. The link, as is the case with links for silent chains, is constructed of a body having a pair of spaced toes separated by a crotch, each toe being defined by diverging outside and inside flanks. The outside flanks may be generally straight or curved while the inside flanks are convexly curved or may be substantially straight. Each link body has a pair of spaced openings symmetrically located therethrough. One toe of the link is longer than the other toe. The longer toe has an additional distinguishing feature. A tangent to the inside flank surface of the longer toe is located at a different distance from the center of the nearest opening thereto than a tangent to the inside flank of the other toe from the center of the nearest opening thereto or the other opening in the link body. In the present embodiment, the perpendicular distance from the center of a nearest pin hole opening to the tangent of the inside flank of the longer toe is greater than the perpendicular distance from the center of the nearest pin hole opening to the tangent of the inside flank of the shorter toe. Further, in this embodiment, the perpendicular distance from the center of each pin hole opening to its respective outer flank surface is the same and also is smaller than the perpendicular distance from either hole opening to its respective inner flank surface; thus ensuring that the plain links will function strictly as inside engagement or contact links.

It should be noted, however, that the present invention would also be effective if applied to a chain wherein a tangent to the outside flank surface of the longer toe from its nearest pin hole opening would be located at a different distance from the center of the nearest pin hole opening to a tangent located on the outside flank surface of the shorter toe.

To construct an endless chain, a plurality of links 20 having thickness A are arranged side by side or transversely to form a set or rank 18 for an articulated pitch 24. A plurality of links 20 having thickness B are similarly arranged side by side to form a set or rank 18 for a guide pitch 26. The set 18 of the articulated pitch 24 and the set 18 of the guide pitch 26 are then arranged in tandem so that the ends of the links of the articulated pitch 24 are interlaced with the adjacent ends of the links of guide pitch 26 and a pin 38 is then inserted to extend through the holes 34, 36 of the interlaced sets of links to form a pivotal connection therebetween. Similarly, a next set 18 of links 20, having a thickness A is positioned tandemly to the set 18 of guide pitch 26, the sets of links are interlaced with each other, and a pin is inserted through the holes of the sets of links to form a pivotal connection therebetween. In this manner, it is possible to construct an endless chain of articulating and guide link pitches wherein sets of links having an A thickness are disposed in an articulated pitch and sets of links having a B thickness are disposed in a guide pitch. In similar fashion, additional sets of articulated ranks having an A thickness or sets of guide rows having a B thickness are joined one to the other until an endless chain of suitable size is constructed.

It will be understood that guide links 52 are disposed at distal ends of the pins 38 on the outer sides of the plain link sets at selected portions along the length of the chain. The guide links 52 serve to connect the articulating link rows and provide structural rigidity throughout the chain.

It is understood that the links 20 may be arranged in sets or ranks 18 with short toes 30 leading or short toes 30 trailing in any desired pattern. For example, the chain could include an articulated rank 24A (FIG. 8) made up from A dimension links 20 with short toes 30 leading and long toes 32 trailing, a next guide rank 26 made up from two guide links 52 and a number of B dimension links 20 with short toes 30 leading and long toes 32 trailing. A next articulated rank 24 could include A dimension links 20 with long toes 32 leading and short toes 30 trailing or short toes 30 leading and long toes 32 trailing, etc. Thus, a first articulated rank could include a grouping of links having an A thickness and predetermined toe orientation. Each successive articulated rank could include a grouping of links having thickness A and either the same toe orientation or the reversed toe orientation. As suggested, the relationship between successively adjacent articulating and guide link ranks could be effected in a completely random manner or there could be established a repeatable pattern for implementation throughout a chain.

Similarly, a first guide rank could include a grouping of links having a B thickness and a certain toe orientation i.e., short toe either leading or trailing. Each successive guide rank could include a grouping of links having a B thickness and either the same toe orientation or the reversed toe orientation. Thus, it is possible to make a chain having an infinite number of associative relationships between sets of links of one toe orientation and sets of links of the reversed toe orientation with either an A or B thickness for inclusion in articulated and/or guide ranks of the chain.

As is clearly shown in FIG. 8, the distances represented by reference numerals 70 and 72 indicate points of contact between the teeth 30 and 32 and the teeth of sprockets 14 and 16 during operation of the chain thereabout. It will be noted that distances 70 and 72 are unequal and as shown, 72 is greater than 70. This unequal and different spacing is effective to vary the elapsed time or interval of contacts between tooth engagements. In this manner it is possible to vary the angular distance that the sprockets are displaced during successive contacts between the links and the teeth of the sprockets so that any noise associated therewith is disrupted from a resonant or tonal type spectrum into a broad band, white noise spectrum that is less noticeable and objectionable to the human ear.

Referring to the configuration of FIG. 7, there is shown distinguishable differences between known power transmission chains and the power transmission chain of the present invention. A group of plain links in an articulating row is "weaved" with a group of thinner plain links in a guide rank. This weave pattern incorporating thin and thick plain links has enabled the chain of the present invention to achieve greater pitch equalization throughout each group of links than was possible with the prior art chains. The dynamic and static load points are distributed more evenly across the length of the connecting pins to achieve this result. Thus, the evenness of load distribution results in greatly reducing wear in the chain.

Changing a standard prior art guide link to an elastic guide link resulted in further improved pitch equalization. An elastic guide link is best described as a guide link that has less stiffness to allow for better pitch equalization after being subjected to prestress. The decreased stiffness during the prestress operation produces an easier, more even pull in the chain links. Best results are obtained when the guide links are thinner than the plain links in the guide row which in turn are thinner than the plain links in the articulating row.

Even though the preferred embodiment describes links of the inside engagement type, it should be understood that it is entirely feasible to use links of the outside engagement type and vary the distance from the center of the pin to the outside working surface. Additionally, the shape of the working surface could be varied and as long as the effect would result in a variation of the elapsed time interval between successive contacts that occur between a link working surface and a sprocket tooth, any embodiment would be considered within the scope of the invention described herein. Further, even though the preferred embodiment employs plain links in articulated rows having a different thickness from plain links in guide rows, in some instances it may be desirable to use all links in both articulated and guide link rows with the same thickness so as to achieve a less complicated assembly arrangement.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A power transmission chain including a plurality of plain links arranged in side by side relationship to form a plurality of ranks of links, each of said plain links having apertures disposed about horizontal and vertical axes of the links,
    a plurality of guide links having apertures disposed about horizontal and vertical axes thereof, said guide links being mounted on distal ends of pins connecting first alternate ranks of said plain links so as to form a guide link row, the other alternate ranks of said plain links being effective to form an articulated link row,
    a plurality of guide link rows and a plurality of articulated rows being interweaved and interconnected by said pins to form said chain, comprising
    said plurality of said plan links in each said guide link row being disposed between said guide links,
    said plurality of guide links in each said guide link row each being equal in thickness and having a kidney shaped configuration that avoids any peripheral discontinuity and are formed having a mass disposed below a horizontal axis substantially greater than a mass disposed above said horizontal axis,
    whereby when said chain is subjected to a load, said configuration and said thickness of said guide links cause the guide links to elongate substantially similarly to said plain links in each of said guide link rows thereby preventing deformation of said connecting pins and maintaining said pins substantially parallel to each other.

2. A power transmission chain including a plurality of plain links arranged in side by side relationship to form a plurality of ranks of links, each of said plain links having apertures disposed about horizontal and vertical axes of links,
    a plurality of guide links having apertures disposed about horizontal and vertical axes thereof, said guide links being mounted on distal ends of pins connecting first alternate ranks of said plain links so as to form a guide link row, the other alternate ranks of said plain links being effective to form an articulated link row,
    a plurality of guide link rows and a plurality of articulated rows being interweaved and interconnected by said pins to form said chain, comprising
    said plurality of said plain links in each said guide link row being disposed between said guide links,
    said plurality of guide links in each said guide link row each being equal in thickness and having a kidney shaped configuration that avoids any peripheral discontinuity, each of said plurality of guide lines has a thickness different from a thickness of each of said plurality of said plain links,
    whereby when said chain is subjected to a load, said configuration and said thickness of said guide links cause the guide links to elongate substantially similarly to said plain links in each of said guide link rows thereby preventing deformation of said connecting pins and maintaining said pins substantially parallel to each other.

3. A power transmission chain as claimed in claim 2 wherein said plurality of guide links and said plurality of plain links are manufactured from the same material.

4. A power transmission chain including a plurality of plain links arranged in side by side relationship to form a plurality of ranks of links, each of said plain links having apertures disposed about horizontal and vertical axes of the links,
    a plurality of guide links having apertures disposed about horizontal and vertical axes thereof, said guide links being mounted on distal ends of pins connecting first alternate ranks of said plain links so as to form a guide link row, the other alternate ranks of said plain links being effective to form an articulated link row,
    a plurality of guide link rows and a plurality of articulated rows being interweaved and interconnected by said pins to form said chain, comprising
    said plurality of said plain links in each said guide link row being disposed between said guide links, said plurality of said plain links being substantially the same in all of said articulated link rows and have a first preselected thickness different from a second preselected thickness of said plurality of said plain links in said guide link rows,
    said plurality of guide links in each said guide link row each being equal in thickness and having a kidney shaped configuration that avoids any peripheral discontinuity,
    whereby when said chain is subjected to a load, said configuration and said thickness of said guide links cause the guide links to elongate substantially similarly to said plain links in each of said guide link rows thereby preventing deformation of said connecting pins and maintaining said pins substantially parallel to each other.

5. A power transmission chain including a plurality of plain links arranged in side by side relationship to form a plurality of ranks of links, each of said plain links hving apertures disposed about horizontal and vertical axes of the links, a plurality of guide links having apertures disposed about horizontal and vertical axes thereof, said guide links being mounted on distal ends of pins connecting first alternate ranks of said plain links so as to form a guide link row, the other alternate ranks of said plain links being effective to form an articulated link row, a plurality of guide link rows and a plurality of articulated rows being interweaved and interconnected by said pins to form said chain, comprising said plurality of said plain links in each said guide link row being disposed between said guide links and each plain link in said plurality of plain links of each said articulated link rows has formed thereon two toes, one of said toes being longer than another one of said toes, said plurality of guide links in each said guide link row each being equal in thickness and having a kidney shaped configuration that avoids any peripheral discontinuity, whereby when said chain is subjected to a load, said configuration and said thickness of said guide links cause the guide links to elongate substantially similarly to said plain links in each of said guide link rows thereby preventing deformation of said connecting pins and maintaining said pins substantially parallel to each other.

6. A power transmission chain including a plurality of plain links arranged in side by side relationship to form a plurality of ranks of links, each of said plain links having apertures disposed about horizontal and vertical axes of the links, a plurality of guide links having apertures disposed about horizontal and vertical axes thereof, said guide links being mounted on distal ends of pins connecting first alternate ranks of said plain links so as to form a guide link row, the other alternate ranks of said plain links being effective to form an articulated link row, a plurality of guide link rows and a plurality of articulated rows being interweaved and interconnected by said pins to form said chain, each one of said plurality of said plain links in said articulated rows comprising a first preselected thickness, each one of said plurality of said plain links in said guide link rows comprising a second preselected thickness, said first thickness of said plain links in the articulated link rows being different from said second thickness of said plain links in said guide link rows, whereby when said chain is subjected to a load, said plain links in said articulated rows and said plain links in said guide link rows deform substantially equally within each of said articulated rows and said guide rows so as to achieve equal load distribution among all links in each row and thereby minimize wear between said apertures of said plain links and said connecting pins.

7. A power transmission chain as claimed in claim 6 wherein each of said plurality of guide links is formed having a mass disposed below a horizontal axis substantially greater than a mass disposed above said horizontal axis.

8. A power transmission chain as claimed in claim 6 wherein said plurality of guide links each has a thickness different from a thickness of each of said plurality of said plain links.

9. A power transmission chain as claimed in claim 8 wherein said plurality of guide links and said plurality of plain links are manufactured from the same material.

10. A power transmission chain as claimed in claim 6 wherein said first thickness of said plain links in said articulated link rows is greater than said second thickness of said plain links in said guide link rows.

11. A power transmission chain as claimed in claim 6 wherein each guide link in said plurality of guide links of each said guide link row is equal in thickness and has a kidney shaped configuration that avoids any peripheral discontinuity.

12. A power transmission chain as claimed in claim 6 wherein each plain link in said plurality of plain links of each said articulated link rows has formed thereon a plurality of toes, one of said toes being longer than another one of said toes.

13. A power transmission chain as claimed in claim 6 wherein each plain link in said plurality of plain links of each said articulated link rows has formed thereon two toes, disposed substantially below a respective aperture and said toes have formed therebetween crotch means, said crotch means having formed thereon first and second inside flank surfaces, said first flank surface and said second flank surface having unequal distances as measured from a center of a pin disposed in its respective aperture.

14. A power transmission chain including a plurality of plain links arranged in side by side relationship to form a plurality of ranks of links, each of said plain links having apertures disposed about horizontal and vertical axes of the links, a plurality of guide links having apertures disposed about horizontal and vertical axes thereof, said guide links being mounted on distal ends of pins connecting first alternate ranks of said plain links so as to form a guide link row, the other alternate ranks of said plain links being effective to form an articulated link row, a plurality of guide link rows and a plurality of articulated rows being interweaved and interconnected by said pins to form said chain, said plain links being formed to have a first toe of a predetermined configuration and a second toe of a second predetermined configuration, said configuration of said first toe being different from said configuration of said second toe, said plain links mounted on said pins at times having said first toe disposed in a leading orientation with said second toe in a trailing orientation and at other times having said second toe in a leading orientation with said first toe in a trailing orientation.

15. A power transmission chain including a plurality of plain links arranged in side by side relationship to form a plurality of ranks of links, each of said plain links having apertures disposed about horizontal and vertical axes of the links, a plurality of guide links having apertures disposed about horizontal and vertical axes thereof, said guide links being mounted on distal ends of pins connecting first alternate ranks of said plain links so as to form a guide link row, the other alternate ranks of said plain links being effective to form an articulated link row, a plurality of guide link rows and a plurality of articulated rows being interweaved and interconnected by said pins to form said chain, comprising said plurality of said plain links in each said guide link row being disposed between said guide links and each plain link in said plurality of plain links of each said articulated link rows has formed thereon two toes disposed substantially below a respective aperture, and said toes have formed therebetween crotch means, said crotch means having formed thereon first and second inside flank surfaces, said first flank surface and said second flank surface having unequal distances as measured from a center of a pin disposed in its respective aperture, said plurality of guide links in each said guide link row each being equal in thickness and having a kidney shaped configuration that avoids any peripheral discontinuity, whereby when said chain is subjected to a load, said configuration and said thickness of said guide links cause the guide links to elongate substantially similarly to said plain links in each of said guide link rows thereby preventing deformation of said connecting pins and maintaining said pins substantially parallel to each other.

16. A power transmission drive chain of the silent variety adapted to drive or be driven by one or more toothed sprockets, comprising:
a plurality of links of like shape arranged in transversely aligned sets of links;
each link comprising a pair of toes each being defined by diverging inside and outside flanks, the inside flanks of each link being joined at a crotch, and each link having a body portion with a pair of spaced openings for receiving pivot means;
said pivot means connecting adjacent and interleaved sets of links and passing through the aligned openings in each adjacent set of links;
one toe of each link being longer and configured differently from the other toe;
each set of links being arranged so that the longer toes are transversely aligned with one another;
some sets of links being flip-flopped in said continuous assembly so that said different toes are leading toes while in the remainder of said sets of links said different toes are trailing toes;
said flip-flopped sets being effective to vary the time interval of successive engagements between said links and said sprockets;
whereby noise associated with and caused by contact frequency of engagement assumes a broad band, white noise spectrum rather than a resonant or tonal type spectrum.

17. A power transmission chain constructed of transversely aligned sets of links joined together in a continuous assembly,
each link of each set having the same shape with a pair of toes each defined by diverging outside and inside flanks, the toes being separated by a crotch;
one toe of each link being different in shape than the other toe of each link with the different shaped toes in each set being transversely aligned; and
some sets of links being flip-flopped in said continuous assembly so that said different toes are leading toes while in the remainder of said sets of links said different toes are trailing toes.

18. A power transmission chain as in claim 17, wherein some sets of links in said assembly have their leading toes longer than said trailing toes and some sets of links in said assembly have their trailing toes longer than their leading toes.

19. A power transmission chain as in claim 17, wherein the inside flanks of each link in said assembly are curved.

20. A power transmission chain as in claim 19, wherein the inside flanks are convexly curved.

21. A power transmission chain as in claim 17, wherein there is a random arrangement of said flip-flopped sets of links in said assembly.

22. A power transmission chain as in claim 17, wherein each link has a body with a pair of spaced openings therethrough.

23. A power transmission chain as in claim 22, wherein the adjacent sets of links in said assembly are interleaved with one another and one of the aligned openings in a set of links is transversely aligned with the aligned openings in the interleaved set of links, and pivot means are received in the transversely aligned openings in the adjacent sets of links to permit articulation of the assembly.

24. A power transmission chain as in claim 22, wherein a tangent to the curved surface of one toe's inside flank is located a greater distance from the pin center of the nearest opening than a tangent to the curved surface of the other toe's inside flank from the pin center of the other opening.

25. A power transmission drive chain of the silent variety adapted to drive or be driven by one or more toothed sprockets, comprising:
a plurality of links of like shape arranged in transversely aligned sets of links;
each link comprising a pair of toes each being defined by diverging inside and outside flanks, the inside flanks of each link being joined at a crotch, and each link having a body portion with a pair of spaced openings for receiving pivot means;
said pivot means connecting adjacent and interleaved sets of links and passing through the aligned openings in each adjacent set of links;
one toe of each link being longer than the other toe;
each of links being arranged so that the longer toes are transversely aligned with one another;
some sets of links being flip-flopped in said continuous assembly so that said different toes are leading toes while in the remainder of said sets of links said different toes and trailing toes.

26. A link for a power transmission chain comprising:
a body having a top and a pair of toes each defined by diverging inside and outside flanks;
said outside flanks being generally straight and said inside flanks being generally curved and joined at a crotch;
one toe of said link being longer than the other toe;
a pair of openings in the body of the link, each opening being substantially equidistant from a center line passing through said body, said crotch and generally bisecting said top;
a tangent to one of said inside flanks being spaced a greater distance from the center of one opening than a tangent to the other inside flank from the other opening.

27. A power transmission drive chain of the silent variety adapted to drive or be driven by one or more toothed sprockets, comprising:

a plurality of links of like shape arranged in transversely aligned sets of links;

each link comprising a pair of toes each being defined by diverging inside and outside flanks, the inside flanks a each link being joined at a crotch, and each link having a body portion with a pair of spaced openings for receiving pivot means;

said pivot means connecting adjacent and interleaved sets of links and passing through the aligned openings in each adjacent set of links;

one toe of each link being longer and having a dimension between its pin center opening and its inside working surface different from a like dimension of the other toe;

each set of links being arranged so that the longer toes are transversely aligned with one another;

some sets of links being flip-flopped in said continuous assembly so that said different toes are leading toes while in the remainder of said sets of links said different toes are trailing toes, whereby said dimension of said one toe and said dimension of said other toe are effective to vary the angular distance said sprockets are displaced during successive contacts between the links and the teeth of the sprockets.

* * * * *

REEXAMINATION CERTIFICATE (3693rd)

United States Patent [19]

Avramidis

[11] B1 4,915,675

[45] Certificate Issued Dec. 29, 1998

[54] PITCH EQUALIZED CHAIN WITH FREQUENCY MODULATED ENGAGEMENT

[75] Inventor: Stellios A. Avramidis, Martinsville, Ind.

[73] Assignee: Borg-Warner Automotive Transmission & Engine Components Corporation, Sterling Heights, Mich.

Reexamination Request:
No. 90/004,428, Oct. 28, 1996

Reexamination Certificate for:
| | |
|---|---|
| Patent No.: | 4,915,675 |
| Issued: | Apr. 10, 1990 |
| Appl. No.: | 316,776 |
| Filed: | Feb. 28, 1989 |

[51] Int. Cl.$^6$ .................................................. F16G 13/04
[52] U.S. Cl. ............................ 474/213; 474/214
[58] Field of Search .......................... 474/212–214, 474/156, 157

[56] References Cited

U.S. PATENT DOCUMENTS

| | | |
|---|---|---|
| 1,463,789 | 8/1923 | Braddock . |
| 1,578,271 | 3/1926 | Dull . |
| 1,868,334 | 7/1932 | Morse . |
| 1,878,882 | 9/1932 | Morse . |
| 2,525,561 | 10/1950 | Pierce .................. 474/213 |
| 2,602,344 | 7/1952 | Bremer . |
| 3,377,875 | 4/1968 | Sand . |
| 3,495,468 | 2/1970 | Griffel . |
| 3,742,776 | 7/1973 | Avramidis . |
| 4,168,634 | 9/1979 | Griffel . |
| 4,342,560 | 8/1982 | Ledvina et al. . |
| 4,463,550 | 8/1984 | Avramidis .......... 474/231 X |
| 4,547,182 | 10/1985 | Rattunde ............ 474/214 |
| 4,906,224 | 3/1990 | Reber ................. 474/213 |
| 4,915,676 | 4/1990 | Komeya .............. 474/213 |

FOREIGN PATENT DOCUMENTS

| | | |
|---|---|---|
| 0 092 900 | 11/1983 | European Pat. Off. . |
| 0 178 818 | 4/1986 | European Pat. Off. . |
| 384 076 | 8/1990 | European Pat. Off. . |
| 385681 | 9/1990 | European Pat. Off. . |
| 411861 | 6/1910 | France . |
| 209710 | 5/1909 | Germany . |
| 126589 | 1/1920 | Germany . |
| 43-99286 | 11/1968 | Japan . |
| 46-26491 | 9/1971 | Japan . |
| 52-110362 | 9/1977 | Japan . |
| 56-27763 | 11/1981 | Japan . |
| 57-141253 | 11/1981 | Japan . |
| 59-63250 | 4/1984 | Japan . |
| 62-132052 | 6/1987 | Japan . |

*Primary Examiner*—Roger Schoeppel

[57] ABSTRACT

A power transmission chain having a plurality of pin connected articulating and guide ranks wherein each rank may include plain links having a thickness that may vary from rank to rank. A group of plain links having a preselected thickness is disposed in articulating ranks throughout the chain. Other groups of plain links having a different preselected thickness are disposed in nonarticulating ranks of the chain. The combination of different thickness plain links disposed in a preselected manner coupled with elastic guide links throughout the chain is effective to minimize wear. The groups of plain links having preselected but differ- ent thicknesses cooperate with different thickness guide links therein so as to improve load distribution there- across, achieve equal deformation between the plain links and the guide links and maintain the transverse connecting pins substantially parallel to each other. The plain links in this chain which are of the two toe variety are characterized by having nonidentical toes. As a result of this difference, the dimensions from the center of the pins to the working surfaces of each toe vary with the result being that the timing between suc- cessive link and sprocket tooth engagements can be varied.

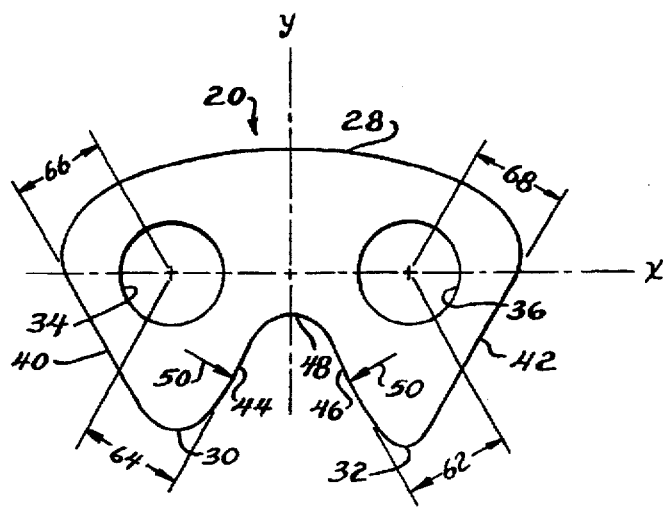

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 14, 16–25 and 27 is confirmed.

Claims 1 and 26 are cancelled.

Claims 2, 4–6, 12, 13 and 15 are determined to be patentable as amended.

Claims 3 and 7–11 dependent on an amended claim, are determined to be patentable.

2. A power transmission chain including a plurality of plain links arranged in side by side relationship to form a plurality of ranks of links, each of said plain links having apertures disposed about horizontal and vertical axes of *the* links, a plurality of guide links having apertures disposed about horizontal and vertical axes thereof, said guide links being mounted *and press fit* on distal ends of pins connecting first alternate ranks of said plain links so as to form a guide link row, the other alternate ranks of said plain links being effective to form an articulated link row, a plurality of guide link rows and a plurality of articulated rows being interweaved and interconnected by said pins to form said chain, comprising said plurality of said plain links in each said guide link row being disposed between said guide links, said plurality of guide links in each said guide link row each being equal in thickness and having a kidney shaped configuration that avoids any peripheral discontinuity, each of said plurality of guide [lines] *links* has a thickness different from a thickness of each of said plurality of said plain links,

[whereby when] said chain [is] *being* subjected to a load *sufficient to cause said guide links to permanently elongate and sufficient to otherwise cause said connecting pins to deform,* said *kidney shape guide link* configuration and said thickness of said guide links *differing sufficiently from said thickness of said plain links to* cause the guide links to *permanently* elongate substantially similarly to said plain links in each of said guide link rows thereby preventing deformation of said connecting pins and maintaining said pins substantially parallel to each other.

4. A power transmission chain including a plurality of plain links arranged in side by side relationship to form a plurality of ranks of links, each of said plain links having apertures disposed about horizontal and vertical axes of the links, a plurality of guide links having apertures disposed about horizontal and vertical axes thereof, said guide links being mounted *and press fit* on distal ends of pins connecting first alternate ranks of said plain links so as to form a guide link row, the other alternate ranks of said plain links being effective to form an articulated link row, a plurality of guide link rows and a plurality of articulated rows being interweaved and interconnected by said pins to form said chain, comprising said plurality of said plain links in each said guide link row being disposed between said guide links, said plurality of said plain links being substantially the same in all of said articulated link rows and have a first peselected thickness different from a second preselected thickness of said plurality of said plain links in said guide link rows, said plurality of guide links in each said guide link row each being equal in thickness and having a kidney shaped configuration that avoids any peripheral discontinuity,

[whereby when] said chain [is] *being* subjected to a load *sufficient to cause said guide links to permanently elongate and sufficient to otherwise cause said connecting pins to deform, kidney shape guide link* said configuration and said thickness of said guide links *differing sufficiently from said thickness of said plain links to* cause the guide links to *permanently* elongate substantially similarly to said plain links in each of said guide link rows thereby preventing deformation of said connecting pins and maintaining said pins substantially parallel to each other.

5. A power transmisson chain including a plurality of plain links arranged in side by side relationship to form a plurality of ranks of links, each of said plain links [hvng] *having* apertures disposed about horizontal and vertical axes of the links, a plurality of guide links having apertures disposed about horizontal and vertical axes thereof, said guide links being mounted *and press fit* on distal ends of pins connecting first alternate ranks of said plain links so as to form a guide link row, the other alternate ranks of said plain links being effective to form an articulated link row, a plurality of guide link rows and a plurality of articulated rows being interweaved and interconnected by said pins to form said chain, comprising said plurality of said plain links in each said guide link row being disposed between said guide links and each plain link in said plurality of plain links of each said articulated link [rows] *row* has formed thereon two toes, one of said toes being longer than another one of said toes, *each of said toes having a pair of flanks, at least one of said toe flanks being configured to contact the flanks of the teeth of an associated sprocket,* said plurality of guide links in each said guide link row each being equal in thickness and having a kidney shaped configuration that avoids any peripheral discontinuity.

[whereby when] said chain [is] *being* subjected to a load *sufficient to cause said guide links to permanently elongate and sufficient to otherwise cause said connecting pins to deform,* said *kidney shape guide link* configuration and said thickness of said guide links *differing sufficiently from said thickness of said plain links to* cause the guide links to *permanently* elongate substantially similarly to said plain links in each of said guide link rows thereby preventing deformation of said connecting pins and maintaining said pins substantially parallel to each other.

6. A power transmission chain including a plurality of plain links arranged in side by side relationship to form a plurality of ranks of links, each of said plain links having apertures disposed about horizontal and vertical axes of the links, a plurality of guide links having apertures disposed about horizontal and vertical axes thereof, said guide links being mounted *and press fit* on distal ends of pins connecting first alternate ranks of said plain links so as to form a guide link row, the other alternate ranks of said plain links being effective to form an articulated link row, a plurality of guide link rows and a plurality of articulated rows being interweaved and interconnected by said pins to form said chain, each one of said plurality of said plain links in said articulated rows comprising a first preselected thickness, each one of said plurality of said plain links in said guide link rows comprising a second preselected thickness, said first thickness of said plain links in the articulated link rows being different from said second thickness of said plain links in siad guide link rows.

[whereby when] said chain [is] *being* subjected to a load *sufficient to cause said plain links in said articulated link rows and guide link rows to permanently elongate and sufficient to otherwise cause said connecting pins to deform,* said plain links in said articulated rows and said plain links in said guide link rows deform substantially equally within each of said articulated rows and said guide rows so as to achieve equal load distribution among all links in each row and thereby minimize wear between said apertures of said plain links and said connecting pins.

12. A power transmission chain as claimed in claim 6 wherein each plain link in said plurality of plain links of each said articulated link rows has formed thereon a plurality of toes, *each of said toes having a pair of flanks, at least one of said flanks being configured to contact the flanks of the teeth of an associated sprocket,* one of said toes being longer than another one of said toes.

13. A power transmission chain as claimed in claim 6 wherein each plain link in said plurality of plain links of each said articulated link rows has formed thereon two toes, disposed substantially below a respective aperture and said toes have formed therebetween crotch means, said crotch means having fomed thereon first and second inside flank surfaces, *at least one of said flanks being configured to contact the flanks of the teeth of an associated spocket,* said first flank surface and said second flank surface having unequal distances as measured from a center of a pin disposed in its respective aperture.

15. A power transmission chain including a plurality of plain links arranged in side by side relationship to form a plurality of ranks of links, each of said plain links having apertures disposed about horizontal and vertical axes of the links, a plurality of guide links having apertures disposed about horizontal and vertical axes thereof, said guide links being mounted *and press fit* on distal ends of pins connecting first alternate ranks of said plain links so as to form a guide link row, the other alternate ranks of siad plain links being effective to form an articulated link row, a plurality of guide link rows and a plurality of articulated rows being interweaved and interconnected by said pins to form said chain, comprising said plurality of said plain links in each said guide link row being disposed between said guide links and each plain link in said plurality of plain links of each said articulated link rows has formed thereon two toes disposed substantially below a respective apertures, and said toes have formed therebetween crotch means, *each of said toes having a pair of flanks, at least one of said flanks being configured to contact the flanks of the teeth of an associated sprocket,* said crotch means having formed thereon first and second inside flank surfaces, said first flank surface and said second flank surface having unequal distances as measured from a center of a pin disposed in its respective aperture, said plurality of guide links in each said guide link row each being equal in thickness and having a kidney shaped configuration that avoids any peripheral discontinuity,

[whereby when] said chain [is] *being* subjected to a load *sufficient to cause said guide links to permanently elongate and sufficient to otherwise cause said connecting pins to deform,* said *kidney shape guide link* configuration and said thickness of said guide links *differing sufficiently from said thickness of said plain links to* cause the guide links to *permanently* elongate substantially similarly to said plain links in each of said guide link rows thereby preventing deformation of said connecting pins and maintaining said pins substantially parallel to each other.

* * * * *